Patented Apr. 28, 1936

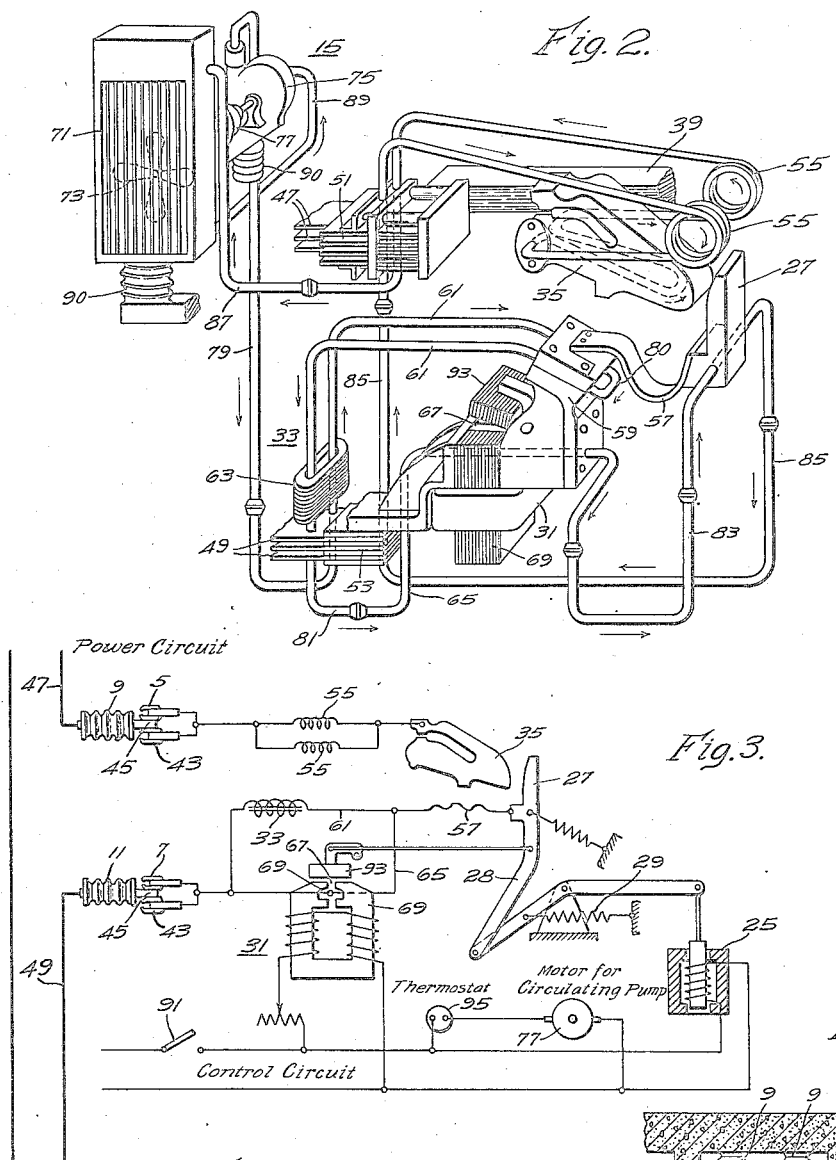
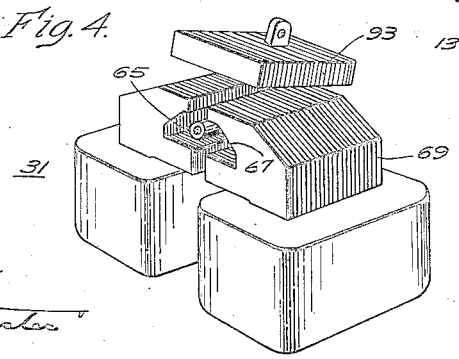

2,039,028

UNITED STATES PATENT OFFICE 2,039,028

ELECTRICAL APPARATUS

Paul R. Pierson, Irwin, Pa., assignor to Westinghouse Electric & Manufacturing Company, East Pittsburgh, Pa., a corporation of Pennsylvania Application September 18, 1934, Serial No. 744,596

24 Claims. (Cl. 175—298)

My invention relates generally to electrical apparatus of the truck-type and it has particular relation to cooling systems for increasing the capacity of high-capacity truck-type switching units without unduly increasing the space occupied by those units.

In recent years the increasing necessity for minimizing discontinuities in electrical power supply circuits has brought about a rather widespread use of truck-type switching equipment by public service companies both in the central stations and in the substations. In the usual installations of such equipment, the power buses and their terminals are mounted within suitable cell structures, and the switching units comprise individual truck mounted assemblages which are readily movable into and out of operative engagement with the stationary cell structures.

This arrangement possesses numerous advantages over the older stationary type installations. If a switching unit becomes inoperative, it is not necessary to shut down that portion of the system while repairs are being made, but rather it is necessary only to wheel out the inoperative unit and wheel in a substitute. All units are mutually interchangeable. Thus a very few spare units will effectively safeguard the operation of a comparatively large system.

Present day operating practice tends toward circuits and equipment of increasing capacity, and, for that reason, the problem of minimizing the space occupied by the circuit breakers and switching equipment has become increasingly important. While truck-type equipment requires less space than other known arrangements, it is still highly desirable that the space occupied by such units shall be utilized to the best possible advantage, and it is with this problem that my invention is particularly concerned.

One method of increasing the rating of such equipment and at the same time minimizing the space requirement consists in the provision of a fluid cooling system for the current-carrying conductors of that unit. Preferably, this is effected by employing hollow tubular current-carrying members for the electrical circuit through the device, and then providing means for circulating water or other liquid therethrough. One arrangement for effecting the circulation of the cooling fluid through the hollow conductors would be to connect the device to the local water supply system.

If this is done, it is quite possible, and, in fact very probable, as experience has shown, that dangerous and damaging electrolysis of the breaker parts and the supply mains may result, and if any break occurs in the fluid system within the equipment, it is probable that a very large quantity of fluid will be discharged in the neighborhood of the apparatus. This of course may result in the short circuiting and damage of adjacent power equipment. Moreover, the average water supply system while quite satisfactory for drinking purposes contains sufficient impurities to make the water semi-conducting, and if such fluids are used within a circuit breaker or other device wherein a column of the cooling liquid is exposed to the full open circuit potential of the controlled circuit, undesirable heating and electrolysis of the cooling fluid, and the possible formation of destructive internal pressures may result.

The principal object of my invention, therefore, is to provide means whereby a fluid cooling system may be used for increasing the rating of truck-type or other switching equipment without any of the disadvantages previously mentioned. I accomplish this principal object of my invention by providing a unitary, closed circuit, self-contained, fluid cooling system for each of the individual switching units, the cooling system being entirely supported upon and movable with the frame structure of the switching unit itself, and including means whereby the cooling fluid used therein is maintained, during the normal operation of the device, at the same potential as the current carrying breaker parts. By this arrangement electrolysis of the breaker parts is effectively eliminated and a much more reliable and efficient system results.

A further object of my invention is to provide an improved truck-type switching unit with a closed circuit, fluid cooling system which shall include means for circulating the cooling fluid during the normal operation thereof.

A still further object of my invention is to provide a closed circuit, fluid cooling system, particularly adapted for use with truck-type switching equipment, which shall include means for circulating the cooling fluid through the system and thermally-responsive means for controlling the operation of the circulating means and the cooling system.

An ancillary object of my invention is to provide an improved liquid which is particularly suitable for use with switching equipment which includes a self-contained fluid cooling system.

The principal field for immediate application of my invention is in connection with truck-type circuit interrupters, and I shall hereinafter describe an embodiment as applied to such devices without, however, intending to limit the scope of my invention except as pointed out in the appended claims.

Referring to the drawings:

Fig. 2 is a perspective view of the electrical conductors and the fluid cooling system which is embodied into the apparatus shown in Fig. 1;

Fig. 3 is a schematic diagram of the electrical connections of the apparatus shown in Fig. 1;

Fig. 4 is a perspective view of the tripping solenoid used in conjunction with the apparatus shown in Fig. 1; and Fig. 5 is a fragmentary view showing two of the switching units shown in Fig. 1 in position within suitable cooperating stationary cell structures.

Figure 1:
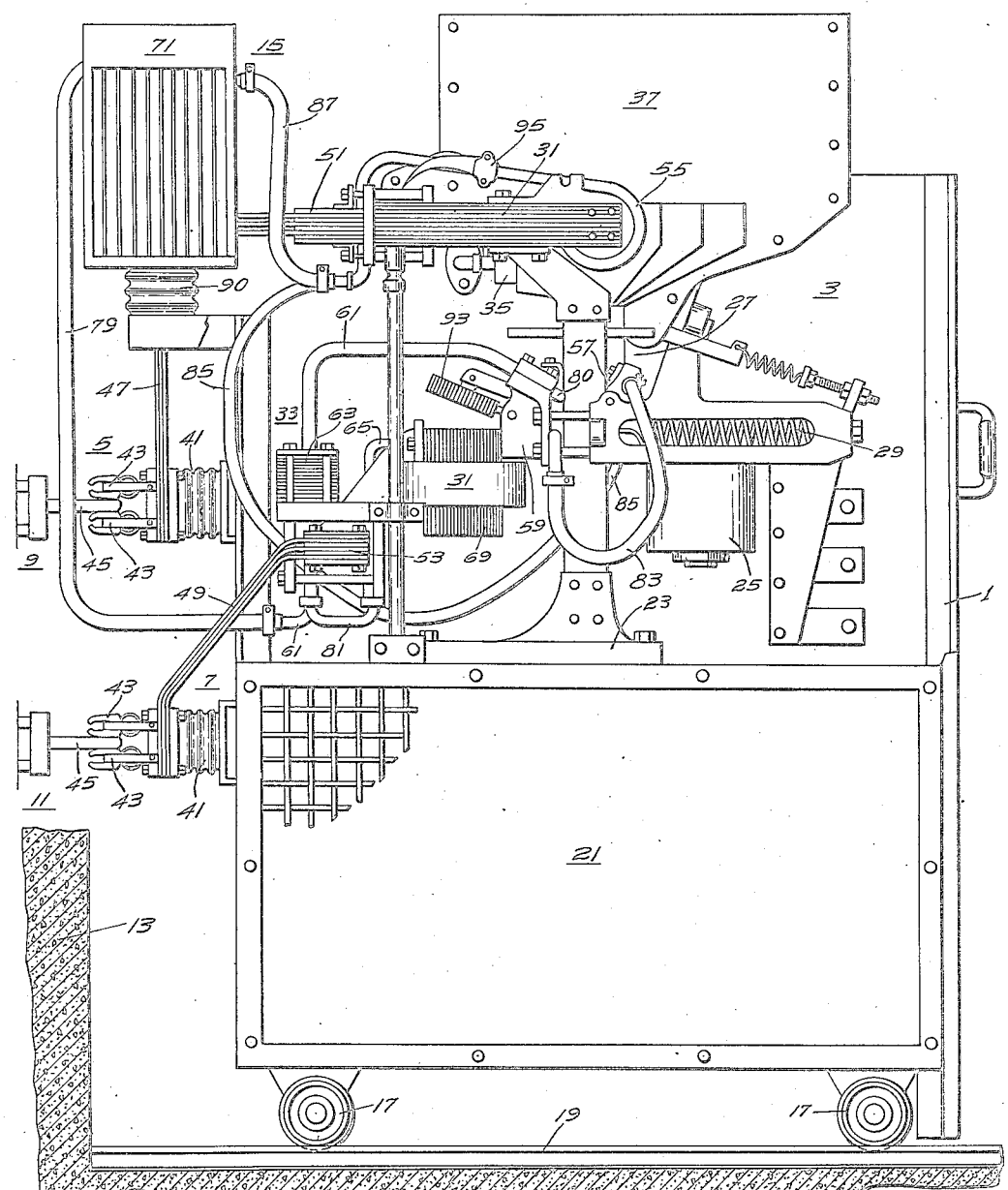
Figure 1 is an elevational view of a truck-type switching unit which is provided with a self-contained, fluid cooling system, a portion of the stationary cell structure and the stationary contacts have also been shown.

The truck-type switching unit shown in Fig. 1 comprises essentially a frame 1 which may be built up of structural steel or similar material, a high speed air break circuit interrupter 3 which is mounted upon the frame 1, a pair of contact members 5 and 7 which are adapted to engage the cooperating contact members 9 and 11 supported upon the stationary cell structure 13, and a unitary circuit cooling system 15 for circulating a cooling fluid through the current-carrying conductors of the breaker to increase the rating thereof. Four wheels 17 are mounted upon the base of the frame structure 1 and are adapted to cooperate with suitable rails 19 disposed within the stationary cell structures. Suitable control equipment for the breaker is mounted in the lower portion 21 of the movable structure.

The circuit breaker 3 is of the conventional high-speed type and comprises a suitable base or support 23, which is bolted to the frame 1 of the switching unit, an operating solenoid 25, a movable contact 27 supported upon a contact arm 28 and normally biased to the open circuit position by a pair of heavy operating springs 29, a tripping solenoid 31 for causing the opening of the breaker to take place at high speed upon the occurrence of predetermined conditions, an inductive shunt 33 for causing the operation of the tripping solenoid 31 to be responsive to the rate of change of current in the controlled circuit, a suitable stationary contact 35 for cooperating with the moving contact, linkages intermediate the operating solenoid 25 and tripping solenoid 31 for effecting the actuation of the moving contact, an arc chute 37 for extinguishing the arc which is established incident to the opening of the controlled circuit, a blow-in magnet 39 for moving the arc within the arc chute 37, and the fluid cooling system 15 which will be described in detail hereinafter.

Each of the contacts 3 and 5, as mentioned above, includes an insulator 41 and a plurality of opposed contact fingers 43, which engage the contact tongues 45 forming a part of the stationary contacts 9 and 11 mounted within the cell structure. Suitably proportioned buses 47 and 49 lead from the contacts 3 and 5 to the upper terminal block 51 and to the lower terminal block 53, respectively. The remaining portions of the electrical circuit through the breaker, as will be described in some detail later, are made up of hollow copper tubes which are so connected with the fluid cooling system that cooling fluid may be circulated therethrough during the operation of the breaker.

The complete electrical circuits through the breaker are comparatively direct. Beginning with the upper terminal contact 5, the current flows successively through the three copper buses 47, the stationary terminal block 51, the energizing coils 55 for the magnetic blow-in field, it being important to note in connection with this that the coils 55 are electrically in parallel, the main stationary contact 35, the main moving contact 27, the flexible shunt 57 which connects the main moving contact 27 with the intermediate contact block 59, and thence through the parallel path provided by the two conductors 61, which, in conjunction with the core member 63, comprise the inductive shunt 33, and the third conductor 65 which extends through the air gap opening 67 within the core 69 of tripping solenoid 31 to the lower contact block 53 which in turn is connected to the lower terminal 7 through the buses 49. The direction of flow within the fluid circuit is somewhat different from direction of current flow in the electrical circuit, and has been indicated by arrows in Fig. 2.

The principal function of the cooling system 15 is to provide a self-contained unit for increasing the normal rating of the circuit breaker without increasing the physical size of the switching unit. Generally, the system comprises a radiator 71, a radiator fan 73, a circulating pump 75, a suitable motor 77 for driving the fan 73 and the circulating pump 75, and means for so interconnecting the hollow conductors and the hollow contacts 27 and 35 of the circuit breaker that a closed fluid circuit wherein the cooling liquid may be circulated is created. Wherever possible, the conduit means which defines the fluid circuit of the cooling system is made of insulating material, preferably rubber tubing, in order to minimize the possibility of excessive voltages being impressed across small lengths of that system.

The various portions of the cooling system are shown particularly in Fig. 2. The rubber tube conduit 79, which leads from the discharge end of the centrifugal, circulating pump 75, connects with the lower end of one of the two tubular copper members 61 which comprise the conductors for the inductive shunt 33. The upper end of this conductor 61 is connected to the other conductor 61 by a looped portion 89 so that the cooling fluid which flows upwardly in one conductor 61 can flow through the intermediate contact block 59 and then return to the contact block 53 through the other conductor 61. The lower end of this other conductor 61 engages a conduit portion 81 which connects with the lower end of the hollow conductor 65 positioned within the space 67 between the opposed poles of the tripping solenoid 31. A section of flexible insulating tubing 83 defines the next portion of the fluid circuit and serves to conduct the cooling liquid from the upper end of the conductor 65 to the moving contact 27 which is hollow. After passing through the contact 27 the cooling fluid is carried by a second flexible insulating conduit 85 to the upper terminal block 51 where it connects with the hollow conducting tubing which forms the nearer of the two arc moving coils 55. After passing through that arc moving coil, the liquid flows through the hollow stationary contact 35 to the other of the arc moving coils 55 and thence back through the upper contact block 51. At this point another section 87 of flexible, insulating tubing is provided for completing the fluid circuit to the upper portion of the radiator 71. The lower end of the radiator connects directly with the circulating pump through the conduit 89. Two insulators 90, which support the motor, circulating pump, radiator, and cooling fan serve, in conjunction with the insulating conduits forming a part of the circulating system, to electrically insulate the entire cooling system from the frame 1.

It will thus be seen that the cooling system is so arranged that it circulates cooling liquid through substantially all of the current-carrying parts of the interrupter except the buses which may readily be made of a suitable size to handle any possible current magnitude. The importance of this cooling system will be made more apparent when it is considered that a circuit breaker normally rated at 6000 amperes may by the addition of such a system be continuously operated at 10,000 amperes without undue heating.

During the normal operation of the switching unit, the fluid used within the cooling system is maintained at the same electrical potential as the current carrying conductors, and the cooling system itself is likewise maintained at that potential. By virtue of this, electrolysis of the breaker parts is effectively eliminated and one of the chief disadvantages of the prior art cooling system is overcome.

Since the fluid cooling system is a closed circuit arrangement, a certain amount of the cooling liquid is exposed to the full potential of the circuit controlled by the breaker when that device is in the open circuit energized position. This fact makes it desirable to use a cooling liquid having a very high liquid resistance. It is also desirable that the liquid have a high flash point, a high boiling point, a low freezing point, and a high thermal capacity. Commercial glycerine seems to meet all these qualifications as do certain forms of insulating oils and certain halogenated hydrocarbons.

The structural details and the mode of operation of the circuit breaker shown in the drawings are essentially similar to devices such as those described in Patent No. 1,669,546, issued to C. Aalborg, on May 15, 1928, and assigned to the assignee of this invention. My invention is not particularly concerned with the breaker and a complete description will therefore be omitted.

In brief, the operation is as follows: To close the breaker, the energizing coil for the tripping solenoid 31 is energized by a suitable means such as the switch 91 (Fig. 3). This causes the movable armature 93 to be attracted to the core 69, and in so doing puts the actuating linkage for the breaker in a position whereby movement of the armature of the actuating solenoid 25 will cause the contacts to close against the force of the springs 29. When in the attracted position, the armature of the actuating solenoid 25 is usually latched down in order to eliminate the necessity for continuously energizing that means. Upon the occurrence of an overload of sufficient magnitude to cause the flux shifting winding 65 disposed within the air gap 67 of the tripping solenoid 31 to alter the normal flux path of that device sufficiently to make the solenoid incapable of holding the armature 93 against the biasing action of the breaker springs 29, the moving contact is moved to the open circuit position at high speed.

The arc moving coils 55 are at all times connected in series with the circuit controlled by the breaker and immediately upon the establishment of an arc by the moving contact 27, the resultant magnetic effect causes the arc to be moved at high speed within the arc chute 37 wherein it is extinguished. The iron core 39 augments the magnetic effect of these coils and renders the arc extinguishing operation more effective.

When the device is being operated at low loads, it is not necessary to circulate cooling fluid through the current-carrying conductors and in order that needless operation of the cooling system shall be prevented, I provide a thermostat 95 for controlling the operation of the driving motor 77 for the circulating pump and the radiator fan. This thermostat 95 may be of any of the conventional types, and is preferably placed on the surface of one of the metallic conductors as is shown in Fig. 1. In this position, it will be relatively sensitive to changes in the temperature which result from increases in the current flowing through the current carrying conductors and, upon this temperature reaching a predetermined value, will cause the driving motor 77 for the circulating pump 75 and the motor fan 73 to be connected to a source of power, in order that the rate of heat dissipation from the breaker shall be increased. Normal connection currents within the system effect some cooling at all times.

The size of the radiator 71 may be varied through rather wide limits, and this arrangement provides a convenient means for increasing the capacity of the apparatus. Also, if desired, the speed at which the circulating pump 75 and the fan 73 are driven may likewise be varied, the numerous possible combinations of these permitting the device to be readily adapted to meet almost any conditions.

In the foregoing I have described a truck-type switching unit which is provided with a self-contained, closed circuit, fluid cooling system for increasing the rating of that device without increasing its physical dimensions and without danger of destructive electrolysis of the breaker parts or the fluid system. By means of my improved self-contained, cooling system, I have eliminated the necessity for connecting apparatus of this type with any external source of fluid supply and have eliminated any possibility of electrolysis of metallic members which contact the cooling fluid during the normal operation of the device. I have made possible the employment of various cooling liquids which may have more desirable characteristics than water, which was the liquid in general use heretofore, and I have provided a device wherein no particular serious results will be produced if a leak should develop in the fluid circuit during the operation of the device. For example, in the structure illustrated—a 10,000 ampere breaker— the amount of water or other liquid ordinarily used is in the neighborhood of 5 gallons. Moreover, my improved arrangement which permits the use of small quantities of particular fluids for effecting the cooling of the apparatus makes possible the use of a closed circuit cooling system on high voltage circuits, something which has not heretofore been considered practical, due to the fact that a certain portion of the fluid circuit is at all times subjected to the normal circuit voltage when the breaker or other equipment is in the open circuit energized condition.

In addition to the improved self-contained cooling system, I have shown a means whereby the rate of heat dissipation of the controlling system may be varied through the use of a thermally-responsive control means for the circulating system of the device.

Numerous modifications and numerous applications of the invention as previously described will immediately suggest themselves to those experienced in the art, and it is my desire that my invention shall not be limited to the particular combinations of structural features disclosed, or to the use of a unitary fluid cooling system with a circuit breaker rather than with other apparatus, but that the language of the accompanying claims shall be accorded the broadest reasonable construction and that the invention shall be limited only by what is expressly stated therein and by the prior art.

I claim the following as my invention:

1. In electrical apparatus of the truck type, a stationary structure, and a cooperating movable structure adapted to be moved into and out of engagement with said stationary structure, said movable structure including conducting means, a self-contained, closed circuit, fluid cooling system therefor, and means for causing the fluid utilized in said cooling system to be maintained at the same electrical potential as said conducting means during the normal operation of said apparatus.

2. In electrical equipment of the truck type, a stationary structure, and a cooperating movable structure adapted to be moved into and out of engagement with said stationary structure, said movable structure including current carrying apparatus, truck support means for said apparatus, and a unitary, closed-circuit, fluid cooling system for dissipating the heat generated by the flow of electrical current through said current carrying apparatus, said cooling system being entirely supported upon said truck support means, and including means for causing the fluid utilized therein to be maintained at the same electrical potential as said current carrying apparatus during the operation of said equipment.

3. In electrical apparatus of the truck type, a stationary structure, contact means supported thereon, and a cooperating movable structure adapted to be moved into and out of operative engagement with said stationary structure, said movable structure including other contact means for engaging said contact means supported upon said stationary structure, current carrying means electrically connected to said other contact means, a unitary, closed circuit, fluid cooling system for dissipating the heat generated by the flow of electrical current through said current carrying means during the operation of said apparatus, and means for insulating the fluid used in said fluid cooling system from all sources of electrical potential other than said current carrying means forming a part of said movable structure.

4. In electrical apparatus of the truck type, a stationary structure, contact means supported thereon, and a cooperating movable structure adapted to be moved into and out of engagement with said stationary structure, said movable structure including current-carrying apparatus, truck support means for said apparatus, and a unitary, closed circuit, fluid cooling system for dissipating the heat generated by the flow of electrical current through said current carrying apparatus, said cooling system being entirely supported upon said truck support means and including a circulating pump, a radiator, and means for electrically insulating the fluid used in said cooling system from all sources of electrical potential other than said current carrying apparatus forming a part of said movable structure.

5. In electrical apparatus, current carrying means, and a unitary, closed circuit, fluid cooling system for dissipating the heat generated by the flow of electrical current through said current carrying means during the operation of said apparatus, said cooling system including means for causing the fluid utilized in said cooling system to be maintained at the same electrical potential as said current carrying means during the normal operation of said apparatus.

6. In electrical apparatus of the truck type, a stationary structure, contact means supported thereon, and a cooperating movable structure adapted to be moved into and out of operative engagement with said stationary structure, said movable structure including other contact means for engaging said contact means supported upon said stationary structure, current carrying apparatus electrically connected to said other contact means, truck support means for said apparatus, and a unitary, closed circuit, fluid cooling system for dissipating the heat generated by the flow of electrical current through said current carrying apparatus, said cooling system being entirely supported upon said truck support means and including a circulating pump, a radiator, a radiator fan, and driving means for said pump, said fan, and means for causing the fluid utilized in said cooling system to be maintained at the same electrical potential as said contact means during the normal operation of said apparatus.

7. In electrical equipment of the truck type, a stationary structure, contact means supported thereon, and a cooperating movable contact structure adapted to be moved into and out of operative engagement with said stationary structure, said movable structure including other contact means for engaging said contact means supported upon said stationary structure, current carrying electrical apparatus electrically connected to said other contact means and including at least some hollow conductors, and a unitary, closed circuit, fluid cooling system which includes means for causing at least some of the cooling fluid contained therein to flow through said hollow conductors to effect the dissipation of the heat which is generated by the flow of electrical current through said apparatus, and means for causing the fluid utilized in said cooling system to be maintained at the same electrical potential as said conductors during the normal operation of said apparatus.

8. In electrical equipment of the truck type, a stationary structure, contact means supported thereon, and a cooperating movable contact structure adapted to be moved into and out of operative engagement with said stationary structure, said movable structure including other contact means for engaging said contact means supported upon said stationary structure, current carrying electrical apparatus electrically connected to said other contact means, and a unitary, closed circuit, fluid cooling system for dissipating the heat which is generated by the flow of electrical current through said apparatus, the current path through said apparatus including a plurality of hollow tubular members of conducting material, and said cooling system including means for so interconnecting said hollow tubular members that they comprise a portion of the fluid circuit thereof, and means for causing the fluid circuit to be maintained at the same electrical potential as the electrical circuit through said equipment.

9. In electrical apparatus of the truck type, a stationary structure, and a cooperating movable structure adapted to be moved into and out of engagement with said stationary structure, said movable structure including circuit interrupting means, truck support means for said circuit interrupting means, and a unitary, closed-circuit fluid cooling system for dissipating the heat generated by the flow of electrical current through said circuit interrupting means, said cooling system being entirely supported upon said truck support means, and including means for causing the fluid utilized therein to be maintained at the same electrical potential as said circuit interrupting means during the operation of said apparatus.

10. In electrical apparatus, a frame structure, circuit interrupting means supported thereon, and a unitary, closed circuit, fluid cooling system for dissipating the heat generated by the flow of electrical current through said interrupting means, the cooling fluid utilized in said system being normally maintained at the same electrical potential as said interrupting means, said cooling system utilizing an insulating fluid of high specific resistance and including conduit means of insulating material in order that said interrupting means may be moved to the open circuit position during the normal operation of said cooling system.

11. In electrical equipment, a frame structure, circuit interrupting means supported thereon, and a unitary, closed circuit, fluid cooling system for dissipating the heat which is generated by the flow of electrical current through said interrupting means, the current path through said interrupting means including a plurality of hollow members of conducting material, said cooling system including means for so interconnecting said hollow members that they comprise a portion of the fluid circuit thereof, and at least a portion of said means being flexible in order that said interrupting means may be actuated from one position to the other, the cooling fluid utilized in said system directly contacting said hollow members and, as a result, being maintained at the same electrical potential as said interrupting means during the normal operation of said equipment.

12. In electrical equipment of the truck type, a stationary structure, contact means supported thereon, and a cooperating movable contact structure adapted to be moved into and out of operative engagement with said stationary structure, said movable structure including other contact means for engaging said contact means supported upon said stationary structure, circuit interrupting means electrically connected to said other contact means, and a unitary, closed-circuit, fluid cooling system for dissipating the heat which is generated by the flow of electrical current through said interrupting means, the current path through said interrupting means including a plurality of hollow members of conducting material, said cooling system utilizing an insulating fluid of high specific resistance, and including conduit means, at least a portion of which is of insulating material, for so interconnecting said hollow members that they comprise a portion of the fluid circuit thereof, the cooling fluid utilized in said system directly contacting said hollow members and, as a result, being maintained at the same electrical potential as said interrupting means during the normal operation of said equipment.

13. In electrical apparatus of the truck type, a stationary structure, and a cooperating movable structure adapted to be moved into and out of engagement with said stationary structure, said movable structure including circuit interrupting means, truck support means for said circuit interrupting means, and a unitary, closed circuit, fluid cooling system for dissipating the heat generated by the flow of electrical current through said circuit interrupting means, said cooling system being entirely supported upon said truck support means and including a circulating pump, a radiator, and means whereby the fluid utilized in said cooling system is maintained at the same electrical potential as said circuit interrupting means during the normal operation of said apparatus, said system utilizing an insulating fluid of high specific resistivity in order that said interrupter may remain in the open circuit energized position without damage thereto.

14. In electrical apparatus of the truck type, a stationary structure, and a cooperating movable structure adapted to be moved into and out of engagement with said stationary structure, said movable structure including circuit interrupting means, truck support means for said circuit interrupting means, and a unitary, closed circuit, fluid cooling system for dissipating the heat generated by the flow of electrical current through said circuit interrupting means, said cooling system being entirely supported upon said truck support means, said cooling system utilizing and insulating fluid of high specific resistance and including thermally responsive means for controlling the operation thereof, and means for electrically insulating the fluid used in said cooling system from all sources of electrical potential other than said circuit interrupting means forming a part of said movable structure.

15. In electrical equipment of the truck type, a stationary structure, contact means supported thereon, and a cooperating movable contact structure adapted to be moved into and out of operative engagement with said stationary structure, said movable structure including other contact means for engaging said contact means supported upon said stationary structure, circuit interrupting means electrically connected to said other contact means, and a unitary, closed-circuit, fluid cooling system for dissipating the heat which is generated by the flow of electrical current through said interrupting means, the current path through said interrupting means including a plurality of hollow members of conducting material, said cooling system utilizing an insulating fluid of high specific resistance, and being provided with means for so interconnecting said hollow members that they comprise a portion of the fluid circuit, said fluid being thereby maintained at the same electrical potential as the current path through said interrupting means at all times during the normal operation of said equipment, means for circulating said fluid through said system, and thermally responsive means for controlling said circulating means.

16. In electrical apparatus of the truck type, a stationary structure, and a cooperating movable structure adapted to be moved into and out of engagement with said stationary structure, said movable structure including conducting means, a self contained, closed circuit, fluid cooling system therefor, thermally responsive means for controlling the operation of said cooling system, and means whereby the cooling fluid utilized in said system is maintained at the same electrical potential as said conducting means at all times during the operation of said apparatus.

17. In electrical equipment of the truck type, a stationary structure and a cooperating movable structure adapted to be moved into and out of engagement with said stationary structure, said movable structure including current-carrying apparatus, truck support means for said apparatus, a unitary, closed circuit, fluid cooling system for dissipating the heat generated by the flow of electrical current through said current carrying apparatus, said cooling system being entirely supported upon said truck support means, thermally responsive means for controlling the operation of said cooling system, and means for causing the fluid utilized in said cooling system to be maintained at the same electrical potential as said conductors during the normal operation of said apparatus.

18. In electrical equipment of the truck type, a stationary structure, contact means supported thereon, and a cooperating movable contact structure adapted to be moved into and out of operative engagement with said stationary structure, said movable structure including other contact means for engaging said contact means supported upon said stationary structure, current carrying electrical apparatus electrically connected to said other contact means and including at least some hollow conductors, and a unitary, closed-circuit, fluid cooling system which includes a circulating pump, means for causing the fluid within said system to flow through said hollow conductors, thermally responsive means for controlling the operation of said circulating pump, and means whereby the fluid utilized in said cooling system is maintained at the same electrical potential as said hollow conductors at all times during the operation of said equipment.

19. In electrical equipment of the truck type, a stationary structure, contact means supported thereon, and a cooperating movable contact structure adapted to be moved into and out of operative engagement with said stationary structure, said movable structure including other contact means for engaging said contact means supported upon said stationary structure, current carrying electrical apparatus electrically connected to said other contact means, and a unitary, closed-circuit, fluid cooling system for dissipating the heat which is generated by the flow of electrical current through said apparatus, the current path through said apparatus including a plurality of hollow tubular members of conducting material, and said cooling system including means for so interconnecting said hollow tubular members that they comprise a portion of the fluid circuit thereof, thereby causing the cooling fluid which is utilized in said system to be maintained at the electrical potential of said hollow members at all times during the operation of said equipment, pump means for causing the fluid contained within said system to flow through said hollow members, and thermally responsive means for controlling said flow producing means.

20. In electrical apparatus of the truck type, a stationary structure, contact means supported thereon, and a cooperating movable structure adapted to be moved into and out of operative engagement with said stationary structure, said movable structure including other contact means for engaging said contact means supported upon said stationary structure, current carrying apparatus electrically connected to said other contact means, truck support means for said apparatus, and a unitary, closed circuit, fluid cooling system for dissipating the heat generated by the flow of electrical current through said current-carrying apparatus, said cooling system being entirely supported upon said truck support means and including a circulating pump, a radiator, a radiator fan, a driving means for said pump, a thermally responsive means for controlling the rate at which heat is dissipated by said cooling system, and means for causing the fluid utilized in said cooling system to be maintained at the same electrical potential as said current-carrying apparatus at all times during the operation of said electrical apparatus.

21. In electrical equipment of the truck type, a stationary structure, contact means supported thereon, and a cooperating movable contact structure adapted to be moved into and out of operative engagement with said stationary structure, said movable structure including other contact means for engaging said contact means supported upon said stationary structure, current-carrying electrical apparatus electrically connected to said other contact means, and including at least some hollow conductors, and a unitary, closed circuit, fluid cooling system which includes means for causing at least some of the cooling fluid contained therein to flow through said hollow conductors to effect the dissipation of the heat which is generated by the flow of electrical current through said apparatus, thermally responsive means for controlling the rate at which heat is dissipated by said cooling system, and means whereby the cooling fluid utilized in said system is normally maintained at the same electrical potential as said hollow conductors.

22. In electrical apparatus, current carrying conductors, a closed circuit, fluid cooling system for dissipating the heat generated by the flow of electrical current through said conductors, and means for causing the fluid utilized in said cooling system to be maintained at the same electrical potential as said conductors during the normal operation of said apparatus.

23. In electrical apparatus, current-carrying means including a plurality of hollow conductors, a closed circuit, fluid cooling system for circulating cooling fluid through said hollow conductors in order to dissipate the heat generated by the flow of electrical current therethrough, and means for causing the fluid which is circulated through said cooling system to be maintained at the same electrical potential as said conductors during the normal operation of said apparatus.

24. In electrical apparatus, current-carrying conductors, a closed circuit, fluid cooling system for dissipating the heat generated by the flow of electrical current through said conductors, thermally responsive means for controlling the operation of said cooling system, and means for causing the fluid utilized in said cooling system to be maintained at the same electrical potential as said conductors during the normal operation of said apparatus.

PAUL R. PIERSON